(12) United States Patent
Crandall-Seibert et al.

(10) Patent No.: US 10,086,924 B2
(45) Date of Patent: Oct. 2, 2018

(54) ALIGNMENT DEVICE FOR A SELECTOR LEVER

(71) Applicant: HAMILTON SUNDSTRAND CORPORATION, Windsor Locks, CT (US)

(72) Inventors: Cory M. Crandall-Seibert, Roscoe, IL (US); Erik Harrington, Machesney Park, IL (US); Jeffrey Paul Jacobs, Roscoe, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 322 days.

(21) Appl. No.: 15/142,555

(22) Filed: Apr. 29, 2016

(65) Prior Publication Data

US 2017/0313407 A1    Nov. 2, 2017

(51) Int. Cl.
| | |
|---|---|
| *B64C 13/14* | (2006.01) |
| *G05G 5/06* | (2006.01) |
| *G05G 1/04* | (2006.01) |
| *B64C 9/00* | (2006.01) |

(52) U.S. Cl.
CPC ............... *B64C 13/14* (2013.01); *G05G 1/04* (2013.01); *G05G 5/06* (2013.01); *B64C 9/00* (2013.01)

(58) Field of Classification Search
CPC ............ G05G 5/03; G05G 5/005; G05G 1/04; G05G 5/06; G05G 5/065; G05G 2505/00; B64C 9/00; B64C 13/10; B64C 13/14; B64C 13/50; B64C 13/26; B64C 13/04
See application file for complete search history.

(56) References Cited

U.S. PATENT DOCUMENTS

| | | | | |
|---|---|---|---|---|
| 5,406,860 | A * | 4/1995 | Easton ................ | F16H 59/02 74/335 |
| 5,775,165 | A * | 7/1998 | Lu ........................ | F16H 61/24 74/473.28 |
| 5,852,953 | A | 12/1998 | Ersoy | |
| 6,098,481 | A | 8/2000 | Mills et al. | |
| 6,382,045 | B1 * | 5/2002 | Wheeler ............. | F16H 61/24 74/473.12 |
| 6,424,245 | B1 * | 7/2002 | Rector ................ | G05G 5/05 335/220 |
| 6,804,586 | B2 * | 10/2004 | Richter .............. | B64C 13/04 244/89 |
| 8,499,661 | B2 * | 8/2013 | Rake ................... | F16H 61/22 74/473.25 |

(Continued)

FOREIGN PATENT DOCUMENTS

| | | |
|---|---|---|
| WO | 2014023529 A1 | 2/2014 |
| WO | 2015122876 A1 | 8/2015 |

OTHER PUBLICATIONS

European Search Report for Application No. 17168839.3-1013/3264216 dated Feb. 6, 2018, 6 pages.

*Primary Examiner* — Valentina Xavier
(74) *Attorney, Agent, or Firm* — Cantor Colburn LLP

(57) ABSTRACT

A selector lever includes a detent pin that travels along a shaft for being positioned within a detent slot of a detent plate for securing the selector lever in place. A magnetic detent pin alignment mechanism provides feedback to an operator for assisting in maneuvering the selector lever to a predetermined position wherein the detent pin may be positioned within a desired detent slot.

20 Claims, 7 Drawing Sheets

(56) References Cited

U.S. PATENT DOCUMENTS

| | | | |
|---|---|---|---|
| 8,950,740 B2 | 2/2015 | Kopp | |
| 2008/0072698 A1* | 3/2008 | Hirano | F16H 59/0204 74/473.21 |
| 2008/0148894 A1 | 6/2008 | Rapin et al. | |
| 2010/0071506 A1* | 3/2010 | Kliemannel | F16H 59/0204 74/625 |
| 2010/0307276 A1* | 12/2010 | Giefer | F16H 59/10 74/473.3 |
| 2016/0357215 A1* | 12/2016 | Kull | G05G 5/06 |
| 2017/0299049 A1* | 10/2017 | Henion | F16H 59/105 |
| 2018/0017987 A1* | 1/2018 | Crandall-Seibert | B64C 13/14 |
| 2018/0029701 A1* | 2/2018 | Covington | H02K 7/003 |

* cited by examiner

ALIGNMENT DEVICE FOR A SELECTOR LEVER

BACKGROUND OF THE INVENTION

The present disclosure relates generally to selector levers and, more particularly, to an alignment device for assisting in aligning a selector lever that may be found, for example, in the cockpit of an aircraft.

Conventional aircraft are commonly equipped with a selector lever for manually controlling the actuation of high-lift surfaces such as flaps, ailerons, or other moveable features of the aircraft. The selector lever is mounted in the cockpit for the pilot to select the desired equipment configuration by moving the lever to a desired position. For instance, if flaps are controlled by the selector lever, the flaps may be positioned in multiple positions corresponding to take off from a standard runway, short runway, landing, etc. The conventional selector lever is typically constructed with a shaft rotatably arranged adjacent one or two detent plates. When the lever is rotated in a desired position for controlling the associated moveable feature, a respective detent pin is positioned within a corresponding detent slot for securing the lever into position. Alignment of the detent pin within a corresponding detent slot is necessary in order to properly secure the selector lever in the desired position. However, due to the nature of the selector lever being operated in a linear movement between a forward and rear position while rotating about a central axis, aligning the detent pin within a corresponding detent slot is difficult. Accordingly, there is a need to assist the operator in properly locating the selector lever in position where the detent pin may accurately be positioned within the desired detent slot.

SUMMARY OF THE INVENTION

In one embodiment a selector lever includes a shaft in pivotal communication with a housing and a detent arrangement in operable communication with the shaft and the housing configured to maintain the shaft in a selected position when engaged and to allow the shaft to rotate when disengaged. A magnetic detent pin alignment mechanism is configured to generate magnetic forces indicative of alignment of the shaft in selectable position.

In one embodiment a system for manipulating a high-lift surface of an aircraft into a plurality of predetermined operative conditions includes a selector lever having a shaft having a proximal end rotatably attached to a pivot. The pivot is disposed within housing and the shaft has a distal end projecting above the housing. A magnet is carried by the shaft. A slide is arranged to be movable along the shaft. A detent pin is operatively connected to the slide. A detent plate is disposed in the housing and has a plurality of detent slots separated by spacers for receiving the detent pin. A magnetic detent pin aligning mechanism communicates with the magnet carried by the shaft to provide feedback regarding a position of the detent pin with respect to one of the detent slots of the detent plate for assisting in positioning the selector lever for aligning the detent pin with respect to one of the slots of the detent plate.

In another embodiment a method of actuating a selector lever includes disengaging a detent arrangement that when engaged maintains the selector lever in a selected position, rotating the selector lever, allowing magnetic forces in a magnetic detent pin aligning mechanism to assist in aligning the selector lever in one of a plurality of selectable positions and engaging the detent arrangement.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. Additionally, where relationship terms are used such as above, below, horizontal and the like, these terms are merely generally descriptive for certain embodiments discussed and are not definitive as other orientations are possible. In particular, the disclosure provides various examples related to a selector lever for aircraft, whereas the advantages of the present disclosure as applied in a related field would be apparent to one having ordinary skill in the art and are considered to be within the scope of the present invention.

Figure 1:
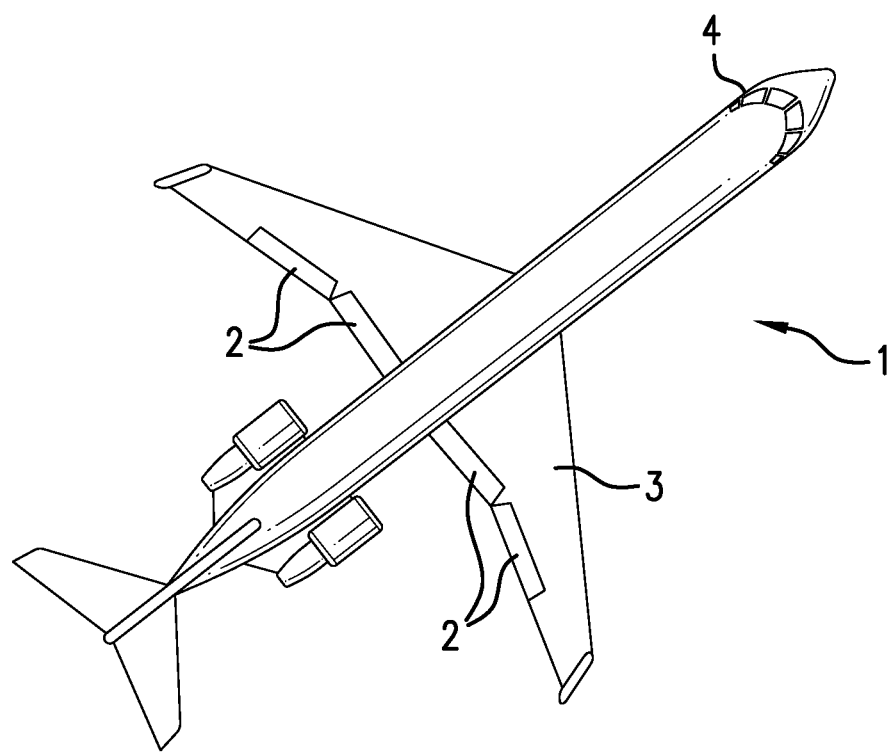
FIG. 1 is an illustration of an aircraft according to one embodiment.

FIG. 1 shows a top view of an aircraft 1 having an aircraft actuator system that employs the selector lever of the present disclosure. Specifically, the selector lever is contemplated to be employed in connection with one or more of the high-lift surfaces associated with an aircraft. For example, the selector lever of the aircraft actuator system may be used to control the position of a plurality of flaps 2 located on the wings 3 of the aircraft 1. The selector lever enables the operator (or pilot) to accurately control the position of the flaps 2 from the cockpit 4. The selector lever may find other uses, in differing environments, without departing from the scope of the present disclosure.

Figure 2A:
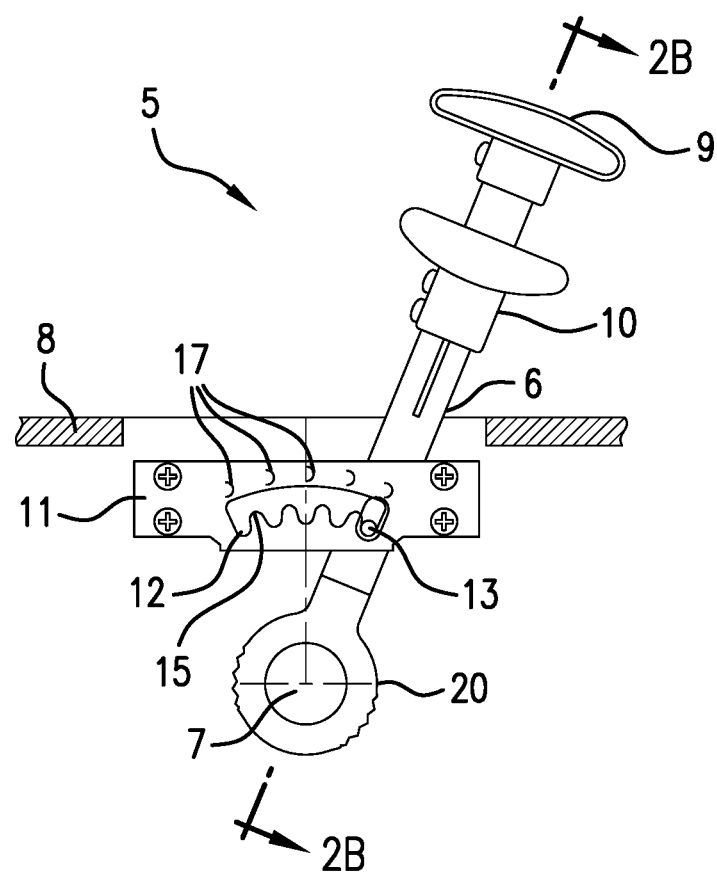
FIG. 2A is a partial cross-sectional side view of a selector lever according to one embodiment.

FIG. 2A is partial cross-sectional side view of a hand-operated selector lever 5 according to one embodiment of the present disclosure. The selector lever 5 includes a shaft 6 having a proximal end 20 that is rotatably attached to a pivot 7 that is disposed in a housing 8. The shaft 6 also comprises a distal end 9 that projects beyond the housing 8. A slide 10 is arranged to move along the shaft 6 along the portion which projects beyond housing 8. FIG. 2A shows a detent plate 11 with a plurality of detent slots 12 disposed in the housing 8 parallel to the path of the pivoting shaft 6. FIG. 2A further shows a detent pin 13 arranged on the shaft 6 to engage the first plurality of detent slots 12 of the detent plate 11. The configuration of the detent slots 12 of detent plate 11 defines a detent arrangement. The detent pin 13 is operatively connected to the slide 10 such that translational movement of the slide 10 along the shaft results in movement of the detent pin 13. As shown in FIG. 2A, a set of attraction magnets 17 are attached to the detent plate 11 at multiple locations along a radial arc relative to the pivot 7. Each of the attraction magnets 17 are oriented in radial alignment relative to one of the detent slots 12 to generate magnetic interaction with a shaft magnet 18 as detailed below.

Figure 2B:
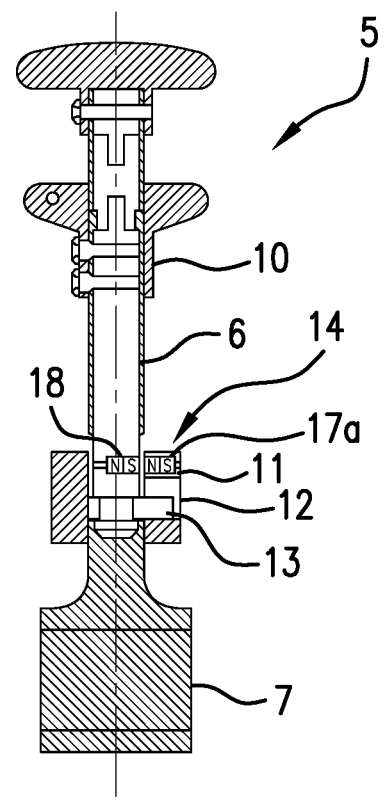
FIG. 2B is a cross-sectional view of the selector lever shown in FIG. 2A taken along line 2B-2B.

FIG. 2B shows a cross-sectional view of the selector lever 5. As shown in FIG. 2B, a magnetic detent pin aligning mechanism 14 includes attraction magnet 17a from the set of attraction magnets 17 attached to the detent plate 11 and the shaft magnet 18 carried by the shaft 6. Attraction magnet 17a has a pole generating a magnetic field and the shaft magnet 18 has a pole generating a magnetic field. As shown in FIG. 2B, attraction magnet 17a has a north pole facing towards the shaft and shaft magnet 18 has a south pole outwardly facing towards the detent plate. In operation, as shaft 6 of lever 5 is rotatably pivoted, the opposite polarity of the magnetic fields of the magnets 17 and 18 generate an attraction or braking force creating a rotational movement resistance on the shaft 6 of the selector lever 5. The magnets 17, 18 are positioned such that the maximum attractive forces between then occurs when the detent pin 13 is rotationally aligned with one the slots 12. A biasing member (not shown) biases the slide 10 and the detent pin 13 toward the pivot 7. The slide 10 may be manually moved against the bias of the biasing member to disengage the detent pin 13 from one of the slots 12 when movement to another of the slots 12 is desired. While the slide 10 is moved such that the detent pin 13 is disengaged from the slots 12 there is no feedback to an operator as to relative rotational location between the detent pin 13 and the slots 12. The magnetic forces between the magnets 17 and 18 in embodiments disclosed and as described above provide position feedback to the operator.

Figure 3A:
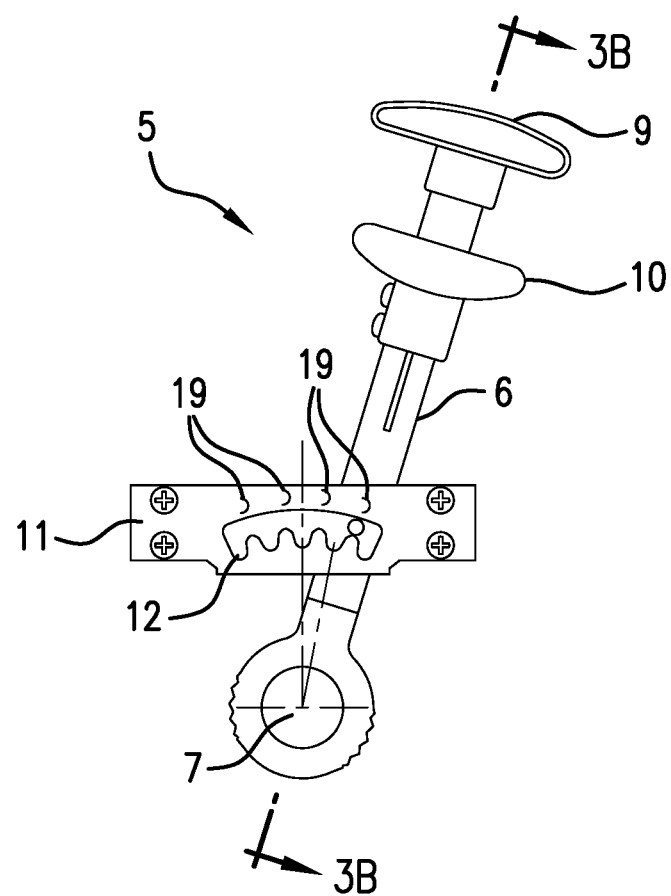
FIG. 3A is a partial cross-sectional views side view of a selector lever according to a second embodiment.

FIG. 3A is partial cross-section side view of a hand-operated selector lever 5 according to a second embodiment of the present disclosure. The selector lever 5 includes a shaft 6 having a proximal end that is rotatably attached to a pivot 7 that is disposed in a housing 8. The shaft 6 also comprises a distal end 9 that projects beyond housing 8. A slide 10 is arranged to move along the portion of shaft 6 which extends beyond housing 8. FIG. 3A shows a detent plate 11 with a plurality of detent slots 12 disposed in the housing 8 parallel to the path of the pivoting shaft 6. A plurality of spacers 15 separates the respective detent slots 12. FIG. 3A further shows a detent pin 13 arranged on the shaft 6 to engage the first plurality of slots 12 of the detent plate 11. The detent pin 13 is operatively connected to the slide 10 such that translational movement of the slide 10 along the shaft results in movement of the detent pin 13. As shown in FIG. 3A, a set of repulsion magnets 19 are carried by detent plate 11 at multiple locations in radial alignment with respective slot spacers 15.

Figure 3B:
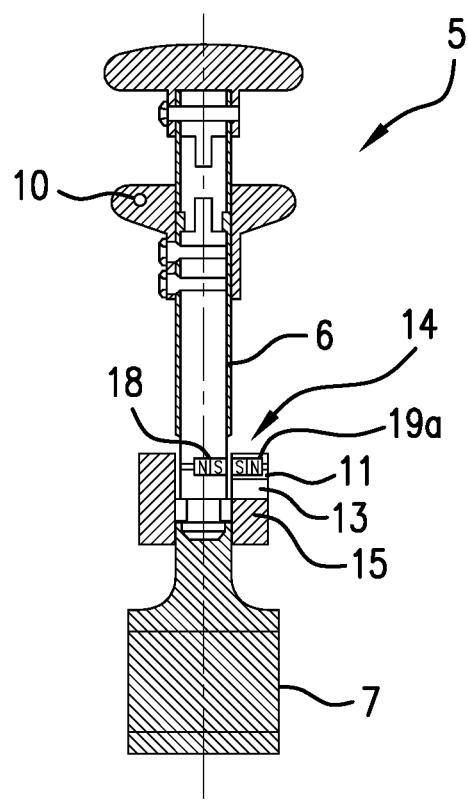
FIG. 3B is a cross-sectional front view of the selector lever shown in FIG. 3A taken along line 3B-3B.

FIG. 3B shows a cross-sectional view of lever 5. In an additional embodiment, a magnetic detent pin aligning mechanism 14 includes a repulsion magnet 19a from the set of repulsion magnets 19 carried by detent plate 11 and a shaft magnet 18 carried by shaft 6. Repulsion magnet 19a has a pole generating a magnetic field and shaft magnet 18 has a pole generating a magnetic field. As shown in FIG. 3B, repulsion magnet 19a has a north pole facing towards the shaft and shaft magnet 18 has a north pole outwardly facing towards the detent plate. In operation, as shaft 6 of lever 5 is rotatably pivoted between forward and aft, the similar polarity of the magnetic fields of the respective magnets 19 and 18 will generate a repulsive force that is exerted on the shaft of the selector lever as the shaft magnet 18 will repel a respective of the repulsive magnets 19 thereby providing feedback urging the lever to continue in a lateral movement either forward or aft of the respective slot spacer 15. The force of repulsive magnets 19 with respect to shaft magnet 18 is sufficient to prevent lever 5 from resting between two detent positions and is sufficient to overcome mechanical drag of the lever that would prevent lateral movement. In operation, repulsive magnets 19 push or snap the lever into a position where the detent pin is aligned with a respective detent slot 12.

FIG. 4A is a partial cross-sectional side view of a hand-operated selector lever 5 according to a third embodiment of the present disclosure. The selector lever 5 includes a shaft 6 having a proximal end that is rotatably attached to a pivot 7 that is disposed in a housing 8. The shaft 6 also comprises a distal end 9 that projects above housing 8. A slide 10 is arranged to move along the portion of the shaft 6 which projects above the housing 8. A detent plate 11 with a plurality of detent slots 12 is disposed in the housing 8 parallel to the path of the pivoting shaft 6. A detent pin 13 arranged on the shaft 6 to engage the first plurality of detent slots 12 of the detent plate 11. The detent pin 13 is operatively connected to the slide 10 such that translational movement of the slide 10 along the shaft results in movement of the detent pin 13. A set of attraction magnets 17 are attached to the detent plate 11 at multiple locations radially aligned with respective detent slots 12 and a set of repulsive magnets 19 are carried by detent plate 11 at multiple locations radially aligned with respective slot spacers 15 which are not receptive of receiving a detent pin.

Figure 4:
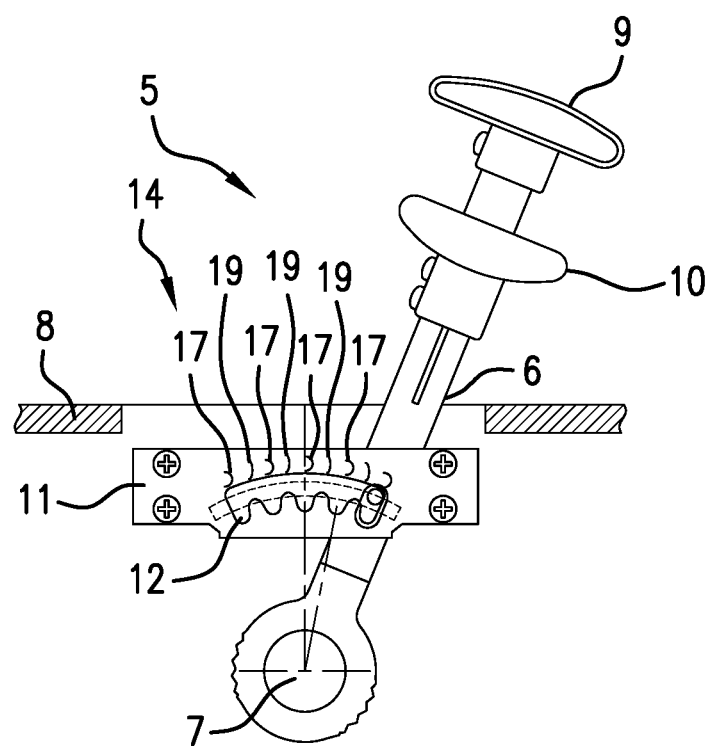
FIG. 4 is a partial cross-sectional side view of a selector lever according to a third embodiment.

As shown in FIG. 4, alignment device 14 includes both set of attraction magnets 17 and set of repulsion magnets 19 carried by detent plate 11 and a shaft magnet 18 carried by shaft 6 (not shown). The attraction magnets 17 and shaft magnet 18 have oppositely facing poles. The repulsion magnets 19 and shaft magnet 18 have similarly facing poles. In operation, as shaft 6 of lever 5 is rotatably pivoted between forward and aft, a respective of the set of repulsion magnets 19 will repel shaft magnet 18 due to the same polarity of the respective magnets thereby providing feedback urging the lever to continue in a lateral movement either forward or aft of the respective slot spacer 15. When the detent pin 13 is radially aligned with a respective detent slot 12, a respective of the attraction magnets 17 will attract shaft magnet 18 thereby providing feedback that the shaft is in position for deploying the detent pin 13 into position with a respective detent slot 12.

Figure 5:
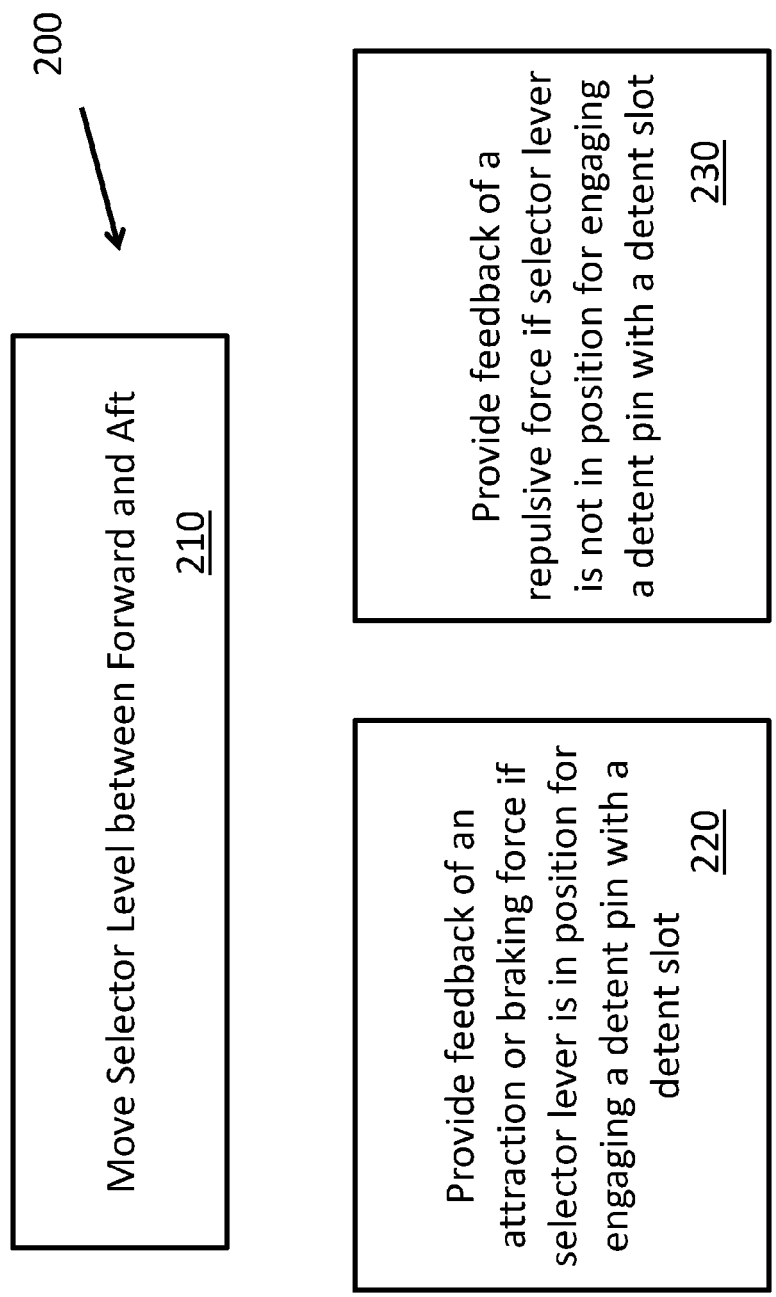
FIG. 5 shows a flow chart illustrating a method for controlling a high-lift surface of an aircraft utilizing a magnetic alignment device for a selector lever.

FIG. 5 illustrates a method 200 for controlling the positioning of high-lift surfaces of an aircraft. In operation, an operator of an aircraft controls the positioning of high-lift surfaces such as flaps, ailerons, or other moveable features of the aircraft by utilizing a selector lever in combination with a detent plate. The detent plate includes detent slots for receiving a detent pin which correspond with predetermined positions of the selector lever for positioning the high-lift surfaces at designated positions, i.e. for take-off, landing, mid-flight, climbing, etc. At block 210, the selector lever is moved between a forward to aft direction with the predetermined positions defined intermittently along the path of the selector lever. At block 220, an alignment mechanism provides feedback through the shaft of the selector lever to the operator regarding the positioning of the selector lever with respect to detent slots for securing the lever in a predetermined operating position. At block 230, the feedback is the result of an attraction or braking force on the shaft when the selector lever is in position for engaging a detent pin with a slot of a detent plate for securing the selector lever at the desired location for desired operational configuration of the flaps and the like. In one embodiment, this is achieved by utilizing horizontally disposed magnets of dissimilar poles which attract themselves when horizontally aligned. These respective magnets are horizontally aligned when the selector lever is positioned such that a detent pin may be positioned within a respective detent slot. At block 240, the feedback is provided indicating that the selector lever is not in position for engaging a detent pin with a respective slot of a detent slot. This is achieved by utilizing horizontally disposed magnets of similar poles which repel themselves when horizontally aligned. These respective magnets are horizontally aligned when the selector lever is positioned such that a detent pin is not positioned in alignment with a respective detent slot. The feedback of the repelling forces of the respective magnets provides sensory direction to the operator to continue moving the respective selector lever.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A selector lever, comprising:
a shaft in pivotal communication with a housing;
a detent arrangement in operable communication with the shaft and the housing configured to maintain the shaft in a selected position when engaged and to allow the shaft to rotate when disengaged; and
a magnetic detent pin alignment mechanism configured to generate magnetic forces indicative of alignment of the shaft in selectable positions.

2. The selector lever of claim 1 including a magnet carried by the shaft, a slide arranged to be moveable along the shaft, a detent pin operatively connected to the slide, and a detent plate disposed in the housing and having a plurality of detent slots separated by spacers for receiving the detent pin.

3. The selector lever of claim 2, wherein said magnetic detent pin alignment mechanism includes a magnet attached to said detent plate.

4. The selector lever of claim 3, wherein said shaft magnet and said magnet carried by said detent plate are horizontally aligned at a predetermined position when said detent pin is radially aligned with a respective detent slot for being inserted into said slot.

5. The selector lever of claim 4, wherein said shaft magnet and said magnet carried by said detent plate have magnetic fields of opposite polarities facing each other when horizontally aligned creating an attraction force between two magnets providing feedback to an operator manipulating said selector lever indicating that said detent pin is radially aligned with a respective detent slot for being inserted into said slot.

6. The selector lever of claim 2, wherein said magnetic detent pin alignment mechanism includes a magnet carried by said detent plate and wherein said shaft magnet and said magnet carried by said detent plate are horizontally aligned at a predetermined position when said detent pin is radially aligned with a spacer disposed between respective detent slots.

7. The selector lever of claim 6, wherein said magnetic fields of said shaft magnet and said magnet carried by said detent plate have similar polarities facing each other when horizontally aligned creating a repulsive force between them providing feedback to an operator manipulating said selector lever indicating that said detent pin is radially aligned with a respective spacer disposed between respective detent slots.

8. The selector lever of claim 2, wherein said magnetic detent pin alignment mechanism includes an attraction magnet carried by said detent plate wherein said attraction magnet and said shaft magnet have magnetic fields of opposite polarities facing each other when horizontally aligned creating an attraction force between them providing feedback to an operator manipulating said selector lever indicating that said detent pin is radially aligned with a respective detent slot for being inserted into said detent slot and said magnetic detent pin aligning mechanism further includes a repulsion magnet carried by said detent plate above said spacers and wherein said repulsion magnet and said shaft magnet have similar polarities facing each other when horizontally aligned creating a repulsive force between the two magnets providing feedback to an operator manipulating said selector lever indicating that said detent pin is radially aligned with a respective spacer disposed between respective detent slots.

9. A system for manipulating a high-lift surface of an aircraft into a plurality of predetermined operative conditions, said system comprising:
a selector lever operatively coupled with said high-lift surface;
said selector lever including a shaft having a proximal end rotatably attached to a pivot, the pivot being disposed within a housing, the shaft having a distal end projecting above the housing;
a slide arranged to be movable along the shaft;
a magnet carried by said shaft;
a detent pin operatively connected to the slide;
a detent plate disposed in the housing and having a plurality of detent slots separated by spacers for receiving said detent pin, said slots corresponding with predetermined operating positions of said high-lift surface;
a magnetic detent pin aligning mechanism communicating with the magnet carried by said shaft providing feedback regarding the position of said detent pin with respect to one of said plurality of detent lots of said detent plate for assisting in positioning the selector lever accordingly for positioning said detent pin with respect to one of said plurality of detent slots of said detent plate.

10. The system of claim 9, wherein said magnetic detent pin aligning mechanism includes a magnet carried by said detent plate.

11. The system of claim 10, wherein said shaft magnet and said magnet carried by said detent plate are horizontally aligned at a predetermined position when said detent pin is radially aligned with a respective detent slot for being inserted into said slot.

12. The system of claim 10, wherein said shaft magnet and said magnet carried by said detent plate have magnetic fields of opposite polarities facing each other when horizontally aligned creating an attraction force between the two magnets providing feedback to an operator manipulating said selector lever indicating that said detent pin is radially aligned with a respective detent slot for being inserted into said slot.

13. The system of claim 10, wherein said magnetic detent pin aligning mechanism includes a magnet carried by said detent plate and wherein said shaft magnet and said magnet carried by said detent plate are horizontally aligned at a predetermined position when said detent pin is radially aligned with a spacer disposed between respective detent slots.

14. The system of claim 13, wherein said magnetic fields of said shaft magnet and said magnet carried by said detent plate have similar polarities facing each other when horizontally aligned creating a repulsive force between them providing feedback to an operator manipulating said selector lever indicating that said detent pin is radially aligned with a respective spacer disposed between respective detent slots.

15. The system of claim 10, wherein said magnetic detent pin aligning mechanism includes an attraction magnet carried by said detent plate wherein said attraction magnet and said shaft magnet have magnetic fields of opposite polarities facing each other when horizontally aligned creating an attraction force between them providing feedback to an operator manipulating said selector lever indicating that said detent pin is radially aligned with a respective detent slot for being inserted into said detent slot and said magnetic detent pin aligning mechanism further includes a repulsion magnet carried by said detent plate above said spacers and wherein said repulsion magnet and said shaft magnet have similar polarities facing each other when horizontally aligned creating a repulsive force between the two magnets providing feedback to an operator manipulating said selector lever indicating that said detent pin is radially aligned with a respective spacer disposed between respective detent slots.

16. The system of claim 9, wherein at least two of said slots correspond to high-lift positions associated with take-off and landing of said aircraft.

17. A method of actuating a selector lever comprising:
disengaging a detent arrangement that when engaged maintains the selector lever in a selected position;
rotating the selector lever;
allowing magnetic forces in a magnetic detent pin aligning mechanism to assist in aligning the selector lever in one of a plurality of selectable positions; and
engaging the detent arrangement.

18. The method of claim 17 including
providing a selector lever operatively coupled with said high-lift surface; said selector lever including a shaft having a proximal end rotatably attached to a pivot, the pivot being disposed within a housing, the shaft having a distal end projecting beyond the housing, said shaft carrying a magnet;
providing a slide arranged to be movable along the shaft which is operatively connected to a detent pin;
providing a detent plate disposed in the housing and having a plurality of detent slots separated by spacers for receiving said detent pin, said slots corresponding with predetermined operating positions of said high-lift surface; and
providing magnetic feedback to an operator via said shaft of the position of said detent pin relative to a detent slot of said detent plate.

19. The method of claim 18, wherein said feedback includes an attraction force indicating that said detent pin is in position for being received within a respective detent slot of said detent plate.

20. The method of claim 18, wherein said feedback includes a repulsion force indicating that said detent pin is above a spacer of said detent plate.

\* \* \* \* \*